(12) United States Patent
Iizuka et al.

(10) Patent No.: US 7,823,378 B2
(45) Date of Patent: Nov. 2, 2010

(54) METHOD OF CONTROLLING EXHAUST GAS PURIFICATION SYSTEM, AND EXHAUST GAS PURIFICATION SYSTEM

(75) Inventors: Akira Iizuka, Fujisawa (JP); Naomi Uchida, Fujisawa (JP); Minoru Tsuchida, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 505 days.

(21) Appl. No.: 11/919,871

(22) PCT Filed: Apr. 24, 2006

(86) PCT No.: PCT/JP2006/308540

§ 371 (c)(1),
(2), (4) Date: Nov. 5, 2007

(87) PCT Pub. No.: WO2006/123512

PCT Pub. Date: Nov. 23, 2006

(65) Prior Publication Data

US 2009/0064665 A1    Mar. 12, 2009

(30) Foreign Application Priority Data

May 17, 2005    (JP) .............................. 2005-144064

(51) Int. Cl.
*F01N 3/00* (2006.01)
(52) U.S. Cl. .............................. 60/295; 60/274; 60/280; 60/286; 60/292; 60/298
(58) Field of Classification Search ............. 60/274, 60/280, 286, 292, 295, 297, 298, 320
See application file for complete search history.

(56) References Cited

U.S. PATENT DOCUMENTS 7,104,051 B2 *    9/2006    Shimasaki et al. ............. 60/297

(Continued)

FOREIGN PATENT DOCUMENTS

EP    1 455 070    9/2004

(Continued)

OTHER PUBLICATIONS

International Search Report (PCT/ISA/210) mailed Jul. 25, 2006 in connection with the international Application PCT/JP2006/308540.

(Continued)

*Primary Examiner*—Binh Q Tran
(74) *Attorney, Agent, or Firm*—Staas & Halsey LLP

(57) ABSTRACT

A method (1) of controlling an exhaust gas purification system has a DPF device (12), where a regeneration control means (35C) has a forced regeneration mode and an arbitrary regeneration mode. In the forced regeneration mode, when it is determined by a regeneration time determination means (34C) that it is time to regenerate a filter (12b) and the temperature of exhaust gas is low, the exhaust gas temperature is raised by an exhaust gas temperature raising means (351C) to forcibly regenerate the filter (12b). In the arbitrary regeneration mode, the filter is arbitrary regenerated based on the result of detection by a collection amount detection means (32C). While the temperature of exhaust gas is raised in the arbitrary regeneration mode by the exhaust gas temperature raising means (351C), operation of a compressor (41) of a vehicle air conditioner is stopped. By means of this, the temperature (Tw) of engine (10) coolant is prevented from abnormally rising while the DPF device (12) is forcibly recovered by arbitrary regeneration.

9 Claims, 6 Drawing Sheets

U.S. PATENT DOCUMENTS

| | | | |
|---|---|---|---|
| 7,110,904 B2 * | 9/2006 | Lippa et al. | 702/102 |
| 7,152,397 B2 * | 12/2006 | Colignon | 60/295 |
| 7,434,389 B2 * | 10/2008 | Robel | 60/303 |
| 7,523,606 B2 * | 4/2009 | Strauser et al. | 60/300 |
| 7,631,491 B2 * | 12/2009 | Lange | 60/295 |

FOREIGN PATENT DOCUMENTS

| | | |
|---|---|---|
| FR | 2 813 098 | 2/2002 |
| JP | 2001-164999 | 6/2001 |
| JP | 2003-155914 | 5/2003 |
| JP | 2003-336523 | 11/2003 |
| JP | 2004-143987 | 5/2004 |
| JP | 2005-120872 | 5/2005 |

OTHER PUBLICATIONS

Patent Abstracts of Japan, Publication No. 2001-164999, Published Jun. 19, 2001.
Patent Abstracts of Japan, Publication No. 2003-155914, Published May 30, 2003.
Patent Abstracts of Japan, Publication No. 2004-143987, Published May 20, 2004.
Supplementary European Search Report, Application No. EP 06 74 5618, dated Jul. 1, 2010.

* cited by examiner

METHOD OF CONTROLLING EXHAUST GAS PURIFICATION SYSTEM, AND EXHAUST GAS PURIFICATION SYSTEM

CROSS REFERENCE TO RELATED APPLICATIONS

This application claims the benefit under 35 U.S.C. Section 371, of PCT International Application Number PCT/JP2006/308540, filed Apr. 24, 2006 and Japanese Application No. 2005-144064 filed May 17, 2005 in Japan, the contents of which are incorporated herein by reference.

FIELD OF THE INVENTION

The present invention relates to a method of controlling exhaust gas purification system and an exhaust gas purification system which purifies particulate matter (PM) with a diesel particulate filter (DPF) device from an exhaust gas of internal combustion engines such as a diesel engine.

DESCRIPTION OF THE RELATED ART

Regulations on exhaust amounts of the particulate matter (PM: diesel particulate: particulate matter: Hereinafter referred to as PM) as well as NOx, CO, HC and the like exhausted from diesel internal combustion engines have been tightening every year. Technology has been developed wherein PM is collected by a filter called as a diesel particulate filter (DPF: Diesel Particulate Filter: Hereinafter referred to as DPF) so as to reduce the amount of PM exhausted to the outside. A DPF device and a continuous regeneration type DPF device carrying a catalyst are among them.

However, with the continuous regeneration type DPF devices, when an exhaust gas temperature is approximately 350° C. or above, PM collected by the DPF is continuously burned and purified, and the DPF self-regenerates, but when the exhaust temperature is low (such as when an internal combustion engine is idling or being driven at low-load/low-speed or the like, for example), the exhaust gas temperature is low and the temperature of the catalyst is lowered and not activated. Thus, an oxidation reaction is not promoted, and it becomes difficult for the PM to be oxidized and the filter regenerated. Therefore, accumulation of PM on the filter continues and clogging of the filter progresses, which causes a problem of the exhaust pressure then rising.

As a method of solving the above problem, a method is proposed whereby the exhaust temperature is forced to rise and the collected PM forcedly burned and removed when clogging of the filter exceeds a predetermined amount. As a means of detecting the filter clogging, there are methods like a detecting method by a differential pressure between upstream side and downstream side of the filter, a detecting method by acquiring a PM accumulation amount through calculating the collected PM amount from an engine driving state or the like from a map data or the like set in advance. Also, as a temperature raising means for an exhaust temperature, there are methods like a fuel injection control method of auxiliary injection at timing later than normal combustion (that is, timing delayed so that burning continues) after main injection in cylinder injection, which is so-called multiple injection (multiple-stage delayed injection) or post injection and a direct fuel injection method into an exhaust pipe.

With this cylinder injection control, when the exhaust temperature is lower than an active temperature of an oxidation catalyst provided on the upstream of the filter or the oxidation catalyst carried by the filter, the temperature of the exhaust gas is raised by an exhaust temperature rise control such as multiple injection or exhaust throttle. When the temperature rises higher than the active temperature because of the temperature rise, an unburned fuel addition control such as post injection is carried out so as to oxidize the fuel in the exhaust gas with the oxidation catalyst. By this oxidation, the temperature of the exhaust gas is raised higher than the temperature at which the PM collected by the filter is burned, the PM is burned and removed, and the filter regenerated.

Normally, in this type of continuous regeneration type DPF device, when the amount of PM accumulated reaches a PM accumulation limit value set in advance, the driving state of the internal combustion engine automatically changes to forced regeneration mode driving. In this forced regeneration mode driving, regeneration processing is carried out by forcedly raising the exhaust temperature or increasing the amount of NOx so as to oxidize the PM collected by the filter.

However, if the forced regeneration processing is carried out while a vehicle is running, since the engine speed is higher than the stopping-idling state, the post injection amount inevitably increases. And as a result, since the fuel is mixed with lubrication oil and dilutes the oil, thus increasing the degree of dilution, this causes a problem of increased oil dilution. Therefore, frequent forced regeneration processing during running is not preferable.

In order to solve the problem of the oil dilution or the like, in the control for the continuous regeneration type DPF device, not only running automatic regeneration for automatic forced regeneration during running but also use of arbitrary regeneration (manual regeneration) for forced regeneration in the stopping-idling state at the same time is proposed. In this arbitrary regeneration, when the filter is clogged, it is notified to a driver by a DPF lamp. The driver who received this notification stops the vehicle and pushes a forced means regeneration button (manual regeneration switch) so as to start arbitrary regeneration.

As exhaust purifiers relating to this, Japanese Patent Application Kokai Publication No. 2003-155914 and Japanese Patent Application Kokai Publication No. 2004-143987, for example, propose the following exhaust purifier. In order that the forced regeneration means can be arbitrarily operated, an operating means (regeneration button) is provided at a drive's seat. When the DPF is brought into an excessively collected state and incurs a need of early forced regeneration or when the driver wants to carry out forced regeneration of the DPF regularly, the driver operates the operating means at both running and stopping-idling or only at idling so as to operate the forced regeneration means. By means of this, forced regeneration can be carried out arbitrarily by the intention of the driver.

In the purifier described in Japanese Patent Application Kokai Publication No. 2004-143987, in the manual forced regeneration in the stopping-idling state, the fuel in the exhaust gas is added and the idling speed is increased. At the same time, an exhaust throttle valve is closed so as to throttle the exhaust amount and the pressure of the exhaust gas is raised. By this, the exhaust temperature is raised efficiently and forced regeneration is promoted.

On the other hand, as shown in FIG. 1, some vehicles have a structure that a condenser 42 in a steam compression type air conditioner is arranged in front of a radiator 18 of an engine 10, and an air fed by a cooling fan (electric fan) 43 of the condenser 42 is fed to the radiator 18 after cooling the condenser 42.

In this air conditioner, a cooling medium gas is insulated and compressed by a compressor to be a high-temperature high-pressure air according to a steam compression type refrigerating cycle and radiates heat to the outside at the condenser. In other words, it is cooled by an outside air and liquefied. And this cooling medium gas becomes a high-temperature liquid and goes from a receiver tank to an expansion valve, where it is insulated and expanded to become a low-temperature low-pressure mist. After that, the cooling medium gas absorbs heat from the outside at a subsequent evaporator and evaporates, continues isothermal expansion, exerts cooling action into the cabin, becomes a low-temperature gas and returns to the compressor.

In a vehicle of this structure, if an air conditioner is operating at the arbitrary regeneration in the stopping-idling state, the temperature of air fed to the radiator after cooling the condenser by the cooling fan of the condenser becomes high by radiation of the condenser of the air conditioner. Thus, cooling capacity for the engine is lowered and the temperature of the engine coolant becomes abnormally high, which is a problem.

Patent Document 1: Japanese Patent Application Kokai Publication No. 2003-155914

Patent Document 1: Japanese Patent Application Kokai Publication No. 2004-143987

SUMMARY OF THE INVENTION

It is an object of the present invention to provide a method of controlling an exhaust gas purification system and an exhaust gas purification system which can prevent abnormal rise of a temperature of an engine coolant by heat generation of a condenser in an air conditioner during forced regeneration of DPF by arbitrary regeneration (manual regeneration) in an exhaust gas purification system provided with a DPF device.

In order to achieve the above objective, a method of controlling an exhaust gas purification system of the present invention used in an internal combustion engine, the engine comprising, a diesel particulate filter device disposed in an exhaust gas passage thereof, a collection amount detection means for detecting a collection amount of diesel particulates in a filter of the diesel particulate filter device, a regeneration time determination means for determining regeneration time of the filter based on a detection result of the collection amount detection means, an exhaust temperature raising means for raising a temperature of the exhaust gas, and a regeneration control means for regenerating the filter when it is determined by the regeneration time determination means as the predetermined regeneration time, the regeneration control means having a forced regeneration mode that the exhaust temperature is raised by the exhaust temperature raising means so as to forcedly regenerate the filter when it is determined by the regeneration time determination means as the predetermined regeneration time and the exhaust gas temperature is low, and an arbitrary regeneration mode that the filter is arbitrarily regenerated based on the detection result of the collection amount detection means, characterized in that while the exhaust temperature is being raised by the exhaust temperature raising means in the arbitrary regeneration mode, a compressor of a vehicular air conditioner is brought into an operation stop state.

That is, when the forced regeneration control is started in the arbitrary regeneration mode (manual regeneration mode) by operating a manual regeneration switch such as a regeneration button, if the compressor of the air conditioner is being operated, the operation is stopped, while if not operated, the operation stop state is maintained. By this, a heat amount radiated by the condenser of the air conditioner is decreased and cooling of the engine is promoted.

Also, in the above method of controlling the exhaust gas purification system, when the compressor of the air conditioner, the condenser of the air conditioner and a cooling fan for cooling the condenser are disposed in the vicinity of radiator of the internal combustion engine, even in the operation stop state of the compressor, the cooling fan is kept in the driving state. In the normal air conditioner operation, driving of the cooling fan is stopped with the operation stop of the compressor. However, with the present invention, the cooling fan is daringly driven so that air can be fed to the radiator via the condenser whose radiation is lowered by the cooling fan. Therefore, the cooling capacity for the engine is improved.

That is, to the air fed by the cooling fan of the internal combustion engine, air fed to the radiator after cooling the condenser with lowered radiation amount is added, by which air-feeding amount can be increased. Therefore, the engine cooling by the radiator is promoted. By means of this, abnormal rise of the coolant temperature of the internal combustion engine at the forced regeneration in the arbitrary regeneration mode can be prevented.

Also, in the above method of controlling a exhaust gas purification system, during the exhaust temperature rise by the exhaust temperature raising means in the arbitrary regeneration mode, only when the coolant temperature of the internal combustion engine is at a predetermined coolant temperature for determination or above, the compressor is brought into the operation stop state.

In the present invention, the operation stop or not of the compressor is determined by the coolant temperature of the internal combustion engine. By this, when the coolant temperature is low and abnormal high temperature is hardly reached, the air conditioner is not brought into the operation stop. Therefore, such a situation that the air conditioner is turned off at the forced regeneration in the arbitrary regeneration mode can be reduced, and the sense of discomfort felt by the driver can be decreased.

Also, in the method of controlling the exhaust gas purification system, in the exhaust temperature rise control by the exhaust temperature raising means, multiple injection in cylinder injection and/or exhaust throttle is carried out. By means of this, the temperature of the exhaust gas can be efficiently raised.

And in order to achieve the above objective, the exhaust gas purification system of the present invention comprises, a diesel particulate filter device disposed in the exhaust gas passage of the internal combustion engine, a collection amount detection means for detecting a collection amount of diesel particulates in a filter of the diesel particulate filter device, a regeneration time determination means for determining regeneration time of the filter based on a detection result of the collection amount detection means, an exhaust temperature raising means for raising the temperature of an exhaust gas, and a regeneration control means for regenerating the filter when it is determined by the regeneration time determination means as the predetermined regeneration time, the regeneration control means having a forced regeneration mode that the exhaust temperature is raised by the exhaust temperature raising means so as to forcedly regenerate the filter when it is determined by the regeneration time determination means as the predetermined regeneration time and the exhaust gas temperature is low and an arbitrary regeneration mode for arbitrarily regenerating the filter based on the detection result of the collection amount detection means, and is configured to carry out control so that while the regeneration control means is raising the exhaust temperature by the exhaust temperature raising means in the arbitrary regeneration mode, a compressor of a vehicular air conditioner is brought into an operation stop state.

The above exhaust gas purification system is configured so that, if the compressor of the air conditioner, a condenser of the air conditioner, and a cooling fan for cooling the condenser are disposed in the vicinity of a radiator of the internal combustion engine, the regeneration control means carries out control that the cooling fan is kept in the driving state even during the operation stop state of the compressor.

Moreover, the above exhaust gas purification system is configured so that, while the exhaust temperature is being raised by the exhaust temperature raising means in the arbitrary regeneration mode, only when the coolant temperature of the internal combustion engine is at a predetermined coolant temperature for determination or above, the regeneration control means carries out control that the compressor is brought into the operation stop state.

Also, the above exhaust gas purification system is configured so that the exhaust temperature raising means carries out multiple injection in cylinder injection and/or exhaust throttle in the exhaust temperature rise control.

By these configurations, the exhaust gas purification system that can execute the above method of controlling the exhaust gas purification system can be provided, and the similar working effects can be exerted.

And in the above exhaust gas purification system, as the diesel particulate filter device, any one or combination of a diesel particulate filter device formed by a filter not carrying a catalyst, a continuous regeneration type diesel particulate filter device having an oxidation catalyst carried by a filter, a continuous regeneration type diesel particulate filter device provided with an oxidation catalyst on the upstream side of a filter, and a continuous regeneration type diesel particulate filter device having a filter carrying a catalyst and provided with an oxidation catalyst on the upstream side of the filter may be employed.

According to a method of controlling an exhaust gas purification system and an exhaust gas purification system of the present invention, abnormal rise of an engine coolant temperature during forced regeneration by arbitrary regeneration (manual regeneration) of DPF can be prevented.

DETAILED DESCRIPTION OF THE INVENTION

A method of controlling an exhaust gas purification system and an exhaust gas purification system of an embodiment according to the present invention will be described below using exhaust gas purification system provided with a continuous regeneration type DPF device comprised of a combination of an oxidation catalyst and a filter with catalyst as an example, referring to the attached drawings.

Figure 1:
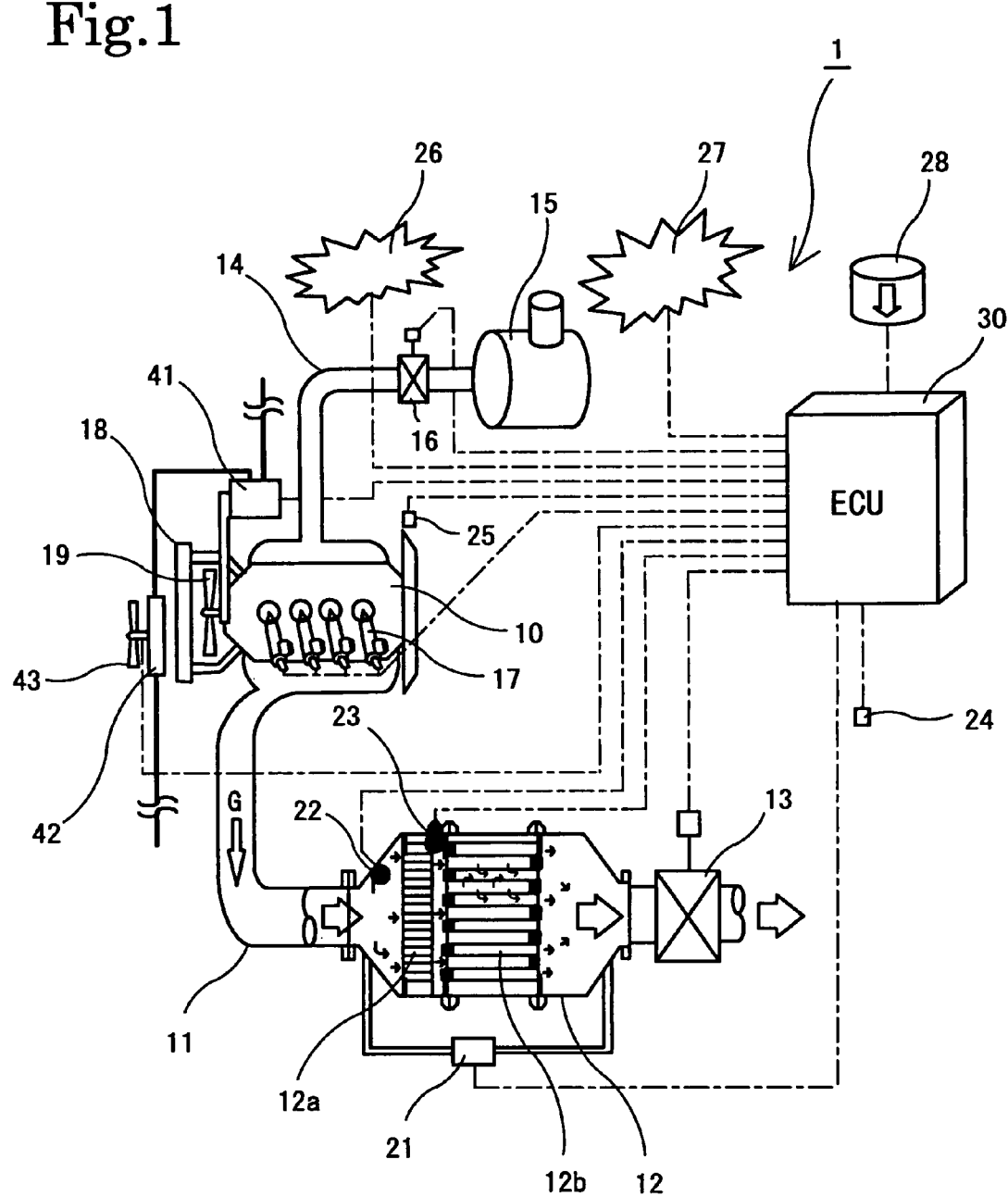
FIG. 1 is a system block diagram of an exhaust gas purification system of an embodiment according to the present invention.

FIG. 1 shows a configuration of an exhaust gas purification system 1 of this embodiment. This exhaust gas purification system 1 comprises a continuous regeneration type DPF device 12 in an exhaust passage 11 of a diesel engine (internal combustion engine) 10. The continuous regeneration type DPF device 12 comprises an oxidation catalyst 12a on the upstream side and a filter with catalyst 12b on the downstream side. Also, on the downstream side of the continuous regeneration type DPF device 12, an exhaust throttle valve (exhaust throttle) 13 is provided.

The oxidation catalyst 12a is formed by having an oxidation catalyst such as platinum (Pt) carried on a carrier with a honeycomb structure of porous ceramics. The filter with catalyst 12b is formed of a filter of a monolith honeycomb wall-flow type in which inlets and outlets of channels of porous ceramics honeycomb are plugged alternately, or a felt-state filter in which inorganic fibers such as alumina are laminated at random or the like. A catalyst of platinum, cerium oxide or the like is carried on the filter portion.

When the monolith honeycomb wall-flow type filter is employed for the filter with catalyst 12b, PM (diesel particulate: particulate matters) in an exhaust gas G is collected (trapped) by a porous ceramic wall. When the fiber filter type is employed, the PM is collected by the inorganic fiber of the filter.

In order to estimate an accumulated amount of the PM in the filter with catalyst 12b, a differential pressure sensor 21 is provided at a conduit pipe connected the upstream side and the downstream side of the continuous regeneration type DPF device 12. Also, for regeneration control for the filter with catalyst 12b, an oxidation catalyst inlet exhaust temperature sensor 22 is provided on the upstream side of the oxidation catalyst 12a and a filter inlet exhaust temperature sensor 23 is provided between the oxidation catalyst 12a and the filter with catalyst 12b, respectively.

An output value of these sensors are inputted to a control device (ECU: engine control unit) 30 carrying out general control for the operation of the engine 10 and also regeneration control for the continuous regeneration type DPF device 12. By control signals outputted from the control device 30, an air-intake throttle valve 16 provided in an air-intake passage 14, a fuel injection device (injection nozzle) 17 of the engine 10, an EGR valve for adjusting an EGR amount provided with an EGR cooler in an EGR passage, not shown, and the like are controlled. The air-intake throttle valve 16 adjusts an amount of air having passed through an air cleaner 15 and entering into an air-intake manifold.

The fuel injection device 17 is connected to a common rail injection system (not shown) temporarily storing a high-pressure fuel whose pressure has been raised by a fuel pump (not shown). To the control device 30, for engine operation, an accelerator opening from an accelerator position sensor (APS) 24, engine speed from an engine speed sensor 25 and other information as well as a vehicle speed, coolant temperature and the like are inputted. Also, from the control device 30, an energizing time signal is outputted so that a predetermined amount of fuel is injected from the fuel injection device 17.

In the regeneration control for the continuous regeneration type DPF device 12, not only automatic forced regeneration is carried during running, but also arbitrary forced regeneration is carried. And a flashing lamp (DPF lamp) 26 and an alarm lamp 27 for drawing an attention of a driver and a regeneration button (manual regeneration switch) 28 are provided for the arbitrary forced regeneration in which when the collected PM amount of the filter with catalyst 12b exceeds a certain amount and the filter with catalyst 12b is clogged so that a driver's attention is drawn and the driver stops the vehicle arbitrarily and starts forced regeneration.

Moreover, a compressor 41 and a condenser 42 are provided for an air conditioner for cooling inside a cabin. The condenser 42 is arranged in front of a radiator 18 of the engine 10. In front of the condenser 42, a cooling fan (electric fan) 43 is provided. In the rear of the radiator 18, a cooling fan 19 for the engine 10 is provided. It is configured that the control device 30 controls the compressor 41 and the cooling fan 43 respectively.

Figure 2:
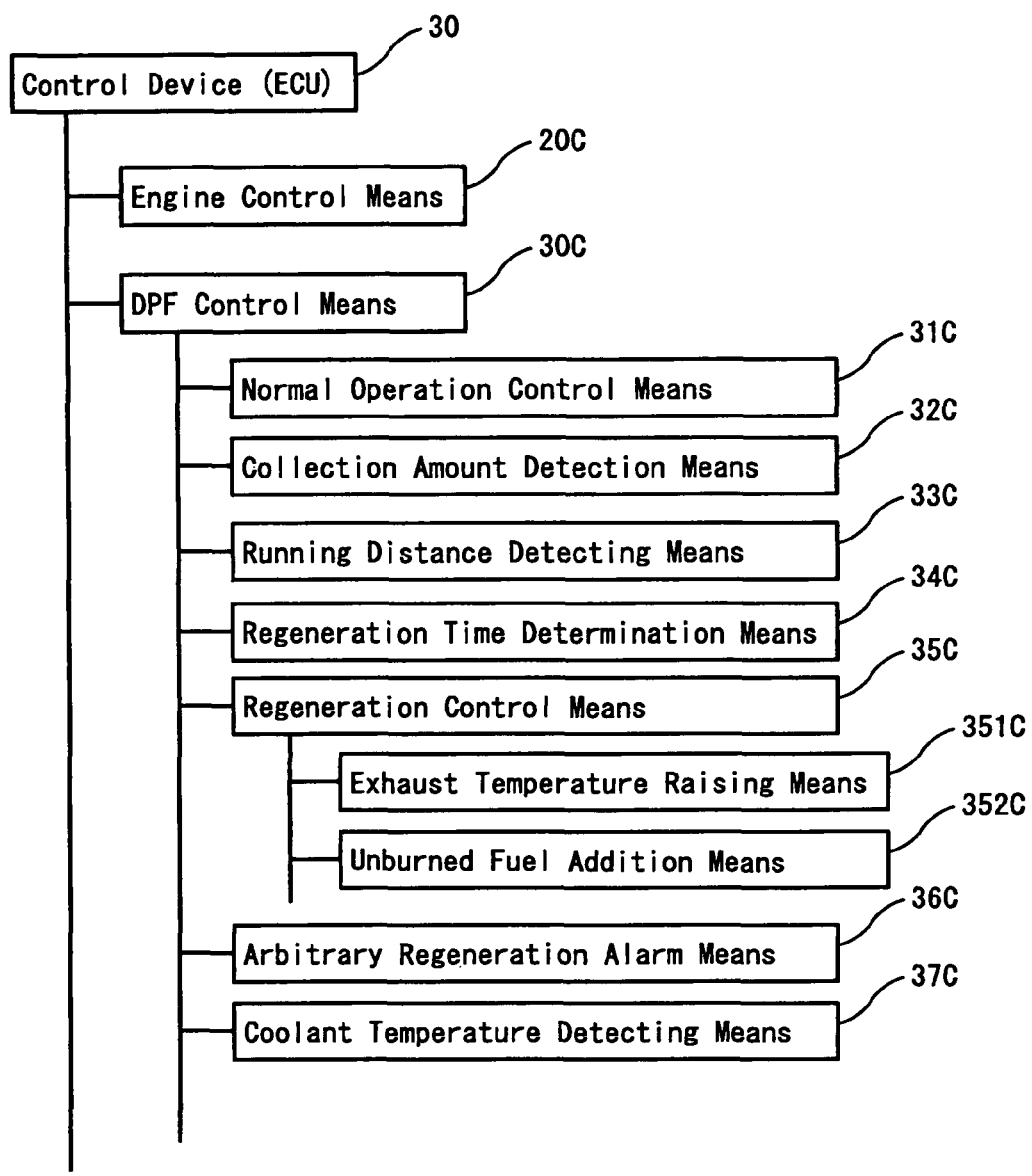
FIG. 2 is a diagram illustrating a control means of the exhaust gas purification system of an embodiment according to the present invention.

The control device 30 comprises, as shown in FIG. 2, an engine control means 20C for controlling operation of the engine 10, a diesel particulate filter (DPF) control means 30C for the exhaust gas purification system 1 and the like. And the DPF control means 30C comprises a normal operation control means 31C, a collection amount detection means 32C, a running distance detecting means 33C, a regeneration time determination means 34C, a regeneration control means 35C, an arbitrary regeneration alarm means 36C, a coolant temperature detecting means 37C and the like.

The normal operation control means 31C is means particularly for normal operation carried out without any relation with regeneration of the continuous regeneration type DPF device 12. The means 31C carries out fuel injection control to inject a predetermined amount from the fuel injection device 17, that is, normal injection control, by an energizing time signal calculated by the control device 30 based on a signal of the accelerator position sensor 24 and a signal of the engine speed sensor 25. In other words, this is the means to eliminate a need to specifically carry out control for regeneration control.

The collection amount detection means 32C is means for detecting a collection amount of PM collected by the filter with catalyst 12b of the continuous regeneration type DPF device 12. In this embodiment, the means 32C makes detection using a differential pressure between the upstream side and the downstream side of the continuous regeneration type DPF device 12, that is, a measured value $\Delta Pm$ by the differential pressure sensor 21.

The running distance detecting means 33C is means for detecting a distance $\Delta Mc$ in which the vehicle has run after DPF regeneration. The running distance $\Delta Mc$ is reset at an appropriate time in a period from start of regeneration to end of the regeneration in case of the forced regeneration.

The regeneration time determination means 34C is means for determining a regeneration start time of the DPF by comparing a differential pressure detected value $\Delta Pm$ detected by the collection amount detection means 32C and the running distance $\Delta Mc$ detected by the running distance detecting means 33C with respective predetermined determination values.

The regeneration control means 35C carries out more or less different control depending on the type of the continuous regeneration type DPF device 12, but comprises an exhaust temperature raising means 351C and an unburned fuel addition means 352C. The exhaust temperature raising means 351C carries out either of multiple injection (multiple-stage delayed injection) in cylinder injection of the engine 10 or exhaust throttle or both of them when the exhaust gas temperature detected by the oxidation catalyst inlet exhaust temperature sensor 22 is lower than a predetermined temperature for determination so as to raise the exhaust temperature to an active temperature of the oxidation catalyst 12a. The unburned fuel addition means 352C supplies unburned fuel into the exhaust gas by post injection or by adding post injection to multiple injection, after that. By oxidizing the unburned fuel at the oxidation catalyst 12a, the filter inlet exhaust temperature detected by the filter inlet exhaust temperature sensor 23 is raised so that a temperature and environment suitable of oxidation and removal of PM is obtained. By these means, the PM collected by the filter with catalyst 12b is forcedly burned and removed so as to forcedly regenerate the filter with catalyst 12b. The exhaust temperature raising means 351C may also carry out the air-intake throttle control for throttling the air-intake throttle valve 16 or EGR control, in the exhaust temperature rise control and unburned fuel addition control.

The arbitrary regeneration alarm means 36C is comprised of a flashing lamp (DPF lamp) 26, an alarm lamp 27 and the like. The means 36C is means for issuing an alarm prompting a driver for a manual operation of the regeneration control means 35C by flashing of the flashing lamp 26 or for encouraging the driver to take the vehicle to a service center by lighting of the alarm lamp 27. The driver who received this alarm can start forced regeneration control by the regeneration control means 35C by operating a manual regeneration button (manual regeneration switch) 28.

The coolant temperature detecting means 37C is comprised of a coolant temperature sensor (not shown) and the like provided at the engine 10. The means 37C is means for detecting a temperature Tw of an engine coolant.

And the DPF control means 30C having these various means is comprised as means for continuing normal operation by the normal operation control means 31C, issuing an alarm prompting the driver for the manual operation of the regeneration control means 35C, or automatically operating the regeneration control means 35C, based on the differential pressure $\Delta Pm$ between the upstream side and the downstream side of the DPF detected by the collection amount detection means 32C and the running distance $\Delta Mc$ after the DPF regeneration detected by the running distance detecting means 33C.

Next, the DPF regeneration control for the exhaust gas purification system 1 will be described. In the control for the exhaust gas purification system 1, the normal operation is controlled by the normal operation control means 31C and PM is collected. However, in this normal operation, the regeneration time determination means 34C monitors if it is regeneration time or not. If it is determined as the predetermined regeneration time by this monitoring, an alarm by the arbitrary regeneration alarm means 36C or running automatic regeneration by the regeneration control means 35C is carried out.

That is, necessity of the arbitrary regeneration and necessity of the running automatic regeneration are determined based on whether the differential pressure $\Delta Pm$ between the upstream side and the downstream side of the DPF detected by the collection amount detection means 32C and the running distance $\Delta Mc$ detected by the running distance detecting means 33C fall within a predetermined range or not. After that, various processing is carried out as necessary, further, the program returns for normal operation by the normal operation control means 31C. And by repeating the normal operation and the regeneration control, the vehicle is operated.

Figure 5:
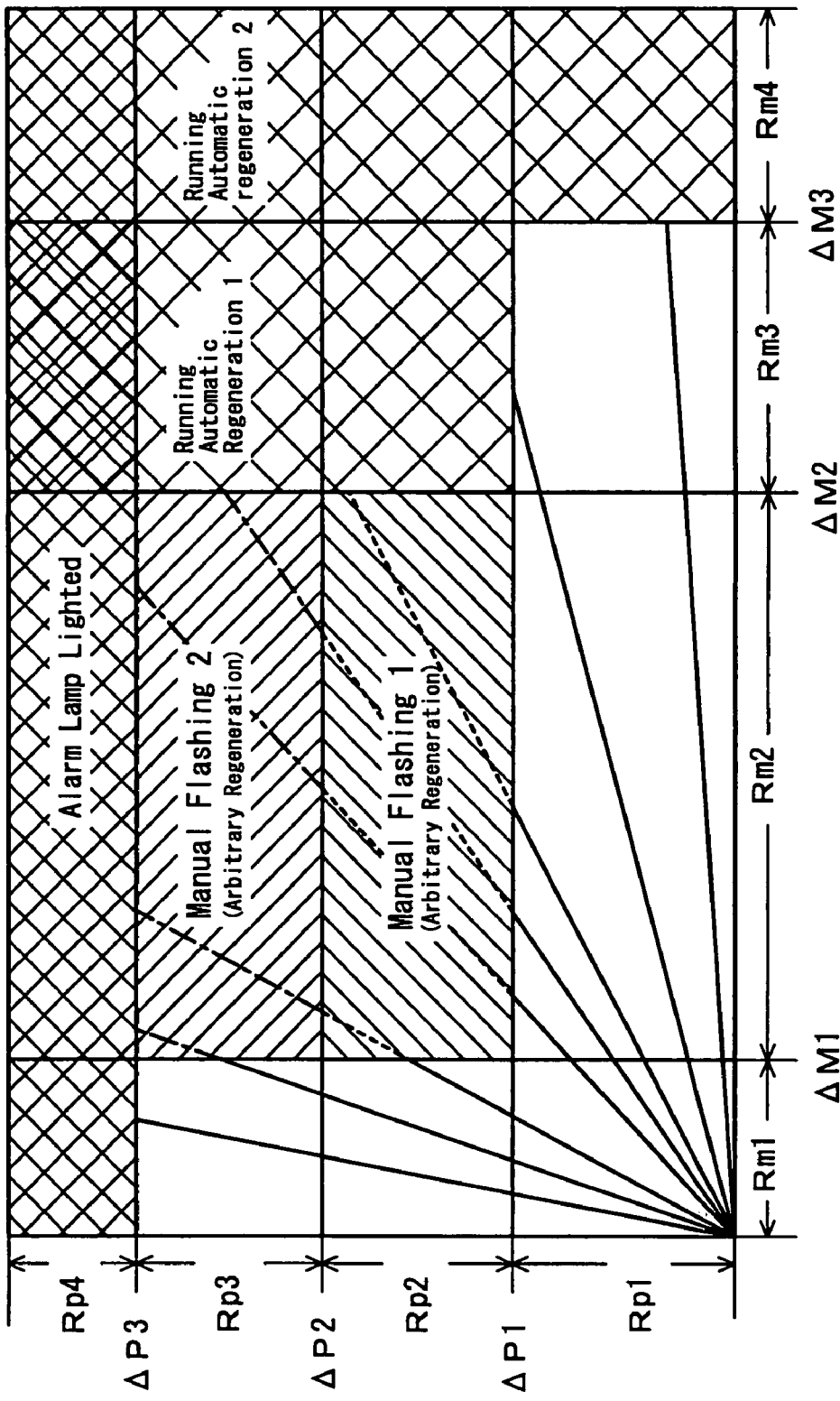
FIG. 5 is a diagram schematically illustrating a regeneration control map of the exhaust gas purification system.

The regeneration control will be described referring to a map for regeneration control shown in FIG. 5. This regeneration control can be executed by a regeneration control flow exemplified in FIG. 6.

First, when the running distance $\Delta Mc$ is in a region Rm1 smaller than a first threshold value $\Delta M1$, if forced regeneration is carried out, evaporation of fuel in oil is not sufficient, and in order to avoid a problem of oil dilution or the like, execution of the regeneration control is prohibited.

Next, when the running distance ΔMc is in a predetermined range Rm2 between the first threshold value ΔM1 and a second threshold value ΔM2, since running is insufficient and evaporation of the fuel mixed in the engine oil is not sufficient, the automatic forced regeneration is not carried out. Instead, in order to prompt the driver to stop the vehicle and to carry out the arbitrary regeneration (manual regeneration) for forced regeneration by pressing the manual regeneration button 28, when the detected differential pressure ΔPm between the upstream side and the downstream side of the DPF exceeds the first threshold value ΔP1 (manual flashing 1), the flashing lamp (DPF lamp) 26 is slowly flashed. Moreover, when the detected differential pressure ΔPm between the upstream side and the downstream side of the DPF exceeds the second threshold value ΔP2 larger than the first threshold value ΔP1 (manual flashing 2), the flashing lamp 26 is quickly flashed so as to strongly prompt the driver for the manual forced regeneration after stopping the vehicle.

And when the running distance ΔMc is in a predetermined range Rm3 between the second threshold value ΔM2 and a third threshold value ΔM3, since the fuel mixed in the engine oil is evaporated sufficiently and the automatic forced regeneration (running automatic regeneration) during running is enabled, when the detected differential pressure ΔPm between the upstream side and the downstream side of the DPF exceeds the first threshold value ΔP1 (running automatic regeneration 1), the forced regeneration control is carried out automatically. By this running automatic regeneration, a burden relating to the manually forced regeneration by the driver, that is, relating to ON/OFF operation of the manual regeneration button 28 is reduced.

Moreover, regardless of the detected differential pressure ΔPm between the upstream side and the downstream side of the DPF, when the running distance ΔMc is in a predetermined range Rm4 where the running distance ΔMc exceeds the third threshold value ΔM3 (running automatic regeneration 2), in order to prevent thermo runaway and DPF melting damage caused by uneven accumulation of PM in the filter with catalyst 12b, the forced regeneration control is carried out automatically.

In these forced regeneration control, when the exhaust gas temperature is lower than a predetermined temperature for determination, only the exhaust temperature rise control by the first stage in multiple injection is carried out. When the exhaust gas temperature exceeds the predetermined temperature for determination, the stage transfers to the second and further temperature rise control, the unburned fuel addition control is carried out by post injection in addition to the exhaust temperature rise control by multiple injection, here. By these controls, it is configured that the temperature of the filter with catalyst 12b is raised and once the PM starts burning, the combustion continues by the burning heat of the PM and the temperature rise control is finished. Also, it may be configured that the temperature rise control is restarted as appropriate while monitoring the PM burning state through the oxygen concentration or exhaust gas temperature on the downstream side of the continuous regeneration type DPF device 12.

Regardless of the running distance ΔMc, when the detected differential pressure ΔPm between the upstream and the downstream of the DPF exceeds the third threshold value ΔP3 (Rp4: Alarm lamp flashing), in order to avoid thermo runaway, which is rapid PM burning, the arbitrary regeneration and running automatic regeneration are prohibited, and the alarm lamp 27 is lighted to prompt the driver to take the vehicle to the service center.

Therefore, the DPF control means 30C comprises the arbitrary regeneration mode and the running automatic regeneration mode. In the arbitrary regeneration mode, when the driver who received an alarm to carry out regeneration control in the stopping-idling state presses the manual regeneration button 28, the forced regeneration control for the filter with catalyst 12b is carried out. In the running automatic regeneration mode, the forced regeneration control for the filter with catalyst 12b is automatically carried out during running of the vehicle.

In this forced regeneration control, when the exhaust gas temperature detected by the oxidation catalyst inlet exhaust temperature sensor 22 is lower than the predetermined temperature for determination, the exhaust gas temperature is raised by multiple injection and the temperature of the oxidation catalyst 12a is raised above the catalyst activation temperature. After that, post injection is carried out to raise the exhaust gas temperature detected by the filter inlet exhaust temperature sensor 23 so as to raise the temperature of the filter with catalyst 12b above the temperature at which the PM starts burning. By this temperature rise, the PM accumulating on the filter with catalyst 12b is burned and the filter with catalyst 12b is forcedly regenerated.

Figure 6:
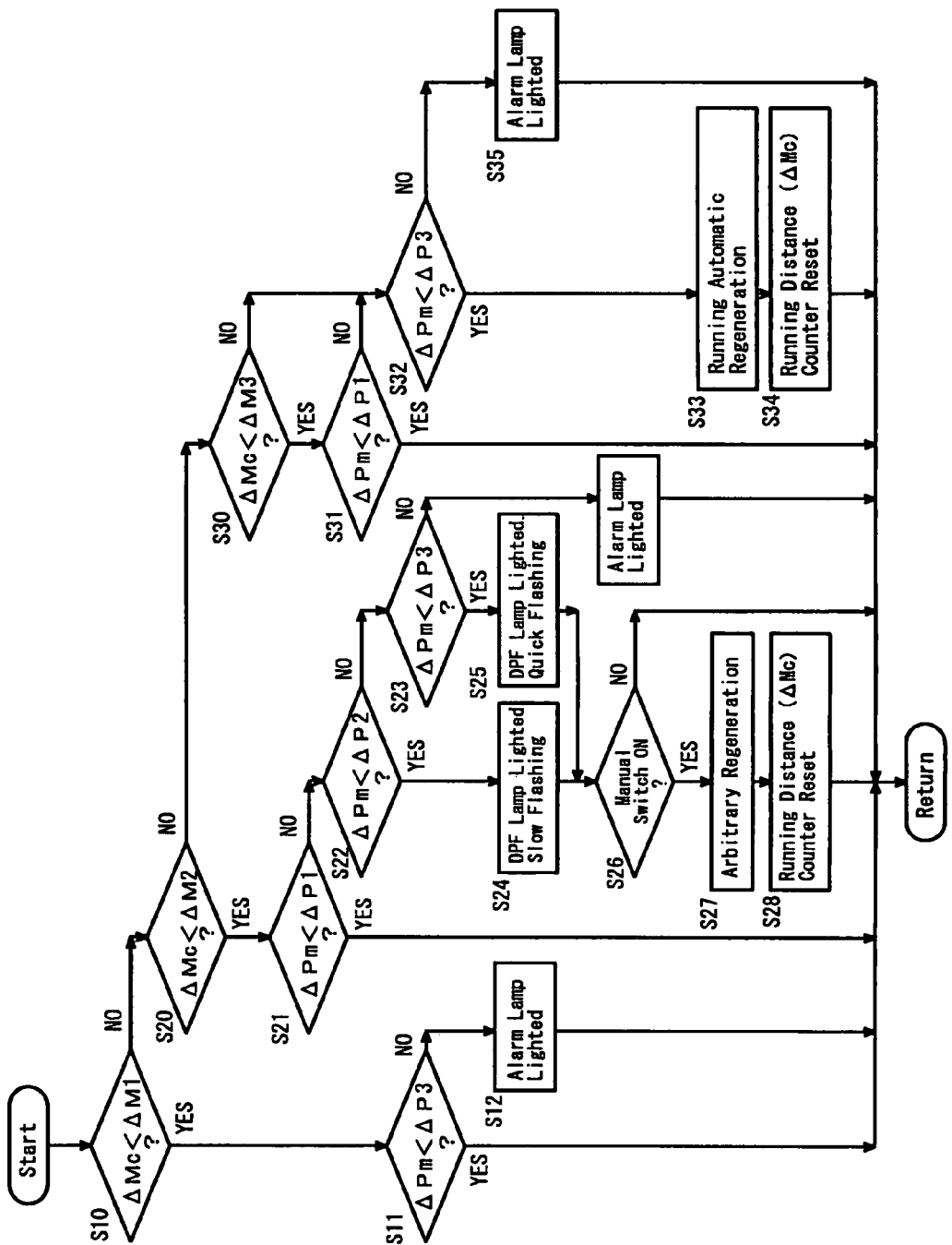
FIG. 6 is a diagram illustrating a regeneration control flow of the exhaust gas purification system.

In the present invention, in the arbitrary regeneration at Step S27 shown in FIG. 6, when the DPF device 12 is forcedly regenerated by the regeneration control means 35C, in order to prevent abnormal rise of the engine coolant temperature, the DPF control means 30C is configured as follows.

In a first embodiment, the DPF control means 30C brings the compressor 41 of the vehicular air conditioner into the operation stop state while the exhaust temperature is being raised by the exhaust temperature raising means 351C in the arbitrary regeneration mode. Also, during the operation stop state of the compressor 41, the cooling fan 43 for cooling the condenser 42 of the air conditioner is not brought into the stop state but kept in the operated state.

Figure 3:
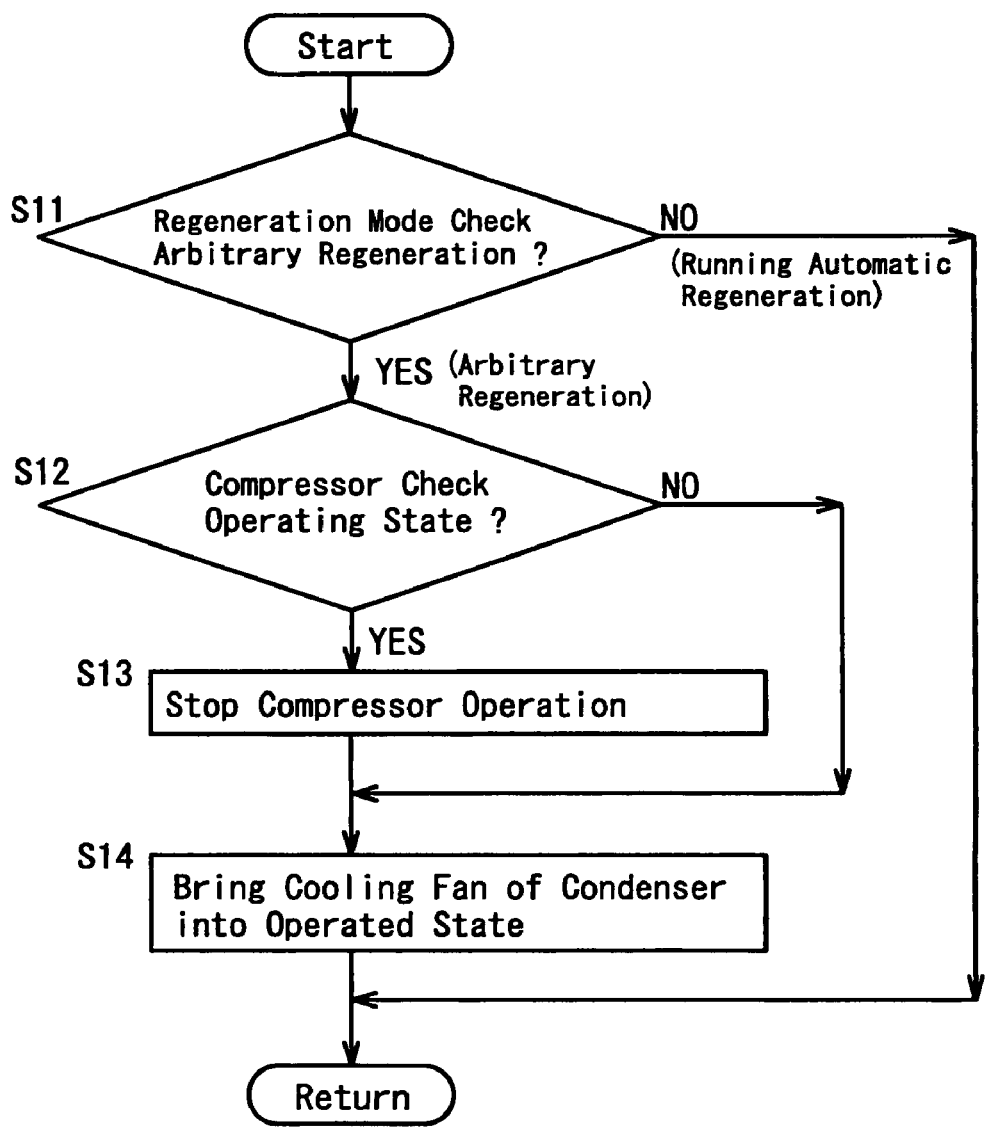
FIG. 3 is a diagram illustrating an air conditioner control flow of a first embodiment according to the present invention.

The control to be associated with the operation of the compressor 41 at the exhaust temperature rise control in this arbitrary regeneration mode can be executed by an air conditioner control flow shown in FIG. 3. The air conditioner control flow in FIG. 3 is shown as a control flow repeatedly invoked with an appropriate interval (time interval for carrying out control) when the DPF device 12 is forcedly regenerated by the regeneration control means 35C in the arbitrary regeneration at Step S27 in FIG. 5.

When the air conditioner control flow is invoked and started, the regeneration mode is checked at Step S11 to determine if it is the arbitrary regeneration mode or the running automatic regeneration mode. If it is determined that the mode is not the arbitrary regeneration mode, that is, the mode is the running automatic regeneration mode, the program returns. This determination can be made easily by setting an arbitrary regeneration flag and determining if this arbitrary regeneration flag is set or not at Step S11 at start of the forced regeneration control by the arbitrary regeneration mode when the manual regeneration button 28 is pressed, for example.

On the other hand, if it is determined that the mode is the arbitrary regeneration mode in this determination, it is checked if the compressor 41 of the air conditioner is in the operated (ON) state or not at Step S12, and if it is in the operated state, the operation is stopped (OFF) at Step S13, and the program goes to Step S14. If it is not in the operated state, the program goes to Step S14 as it is.

At Step S14, the cooling fan 43 for cooling the condenser 42 of the air conditioner is brought into the operated state. That is, if the cooling fan 43 is in the operated state, the operated state is maintained, while if it is in the operation stop state, it is brought into the operated state. And the program returns.

As shown in the air conditioner control flow in FIG. 3, if the compressor 41 of the air conditioner is operating when the manual regeneration button 28 is pressed, by stopping the operation so as to bring it into the operation stop state, the heat amount radiated from the condenser 42 is reduced. Moreover, the operated state of the cooling fan 43 is kept so that a cooling air is fed to the radiator 18 of the engine 10. In the conventional art, if the operation of the compressor 41 is stopped, the operation of the cooling fan 43 of the condenser 42 is also stopped normally. However, in the present invention, the cooling fan 43 is kept in the operated state to keep on feeding air, and the engine is cooled while raising the cooling efficiency of the radiator 18. By means of this, abnormal temperature rise of the temperature Tw of the engine coolant is prevented.

Also, in a second embodiment, the DPF control means 30C brings the compressor 41 of the vehicular air conditioner into the operation stop state only when the temperature Tw of the engine coolant detected by the coolant temperature detecting means 37C is above the predetermined coolant temperature Tw1 for determination, while exhaust temperature is being raised by the exhaust temperature raising means 351C in the arbitrary regeneration mode. When the temperature Tw is below the predetermined coolant temperature Tw1 for determination, the compressor 41 of the vehicular air conditioner is not brought into the operation stop state. Similarly to the first embodiment, the cooling fan 43 for cooling the condenser 42 of the air conditioner is brought into the operated state even during the operation stop state of the compressor 41.

Figure 4:
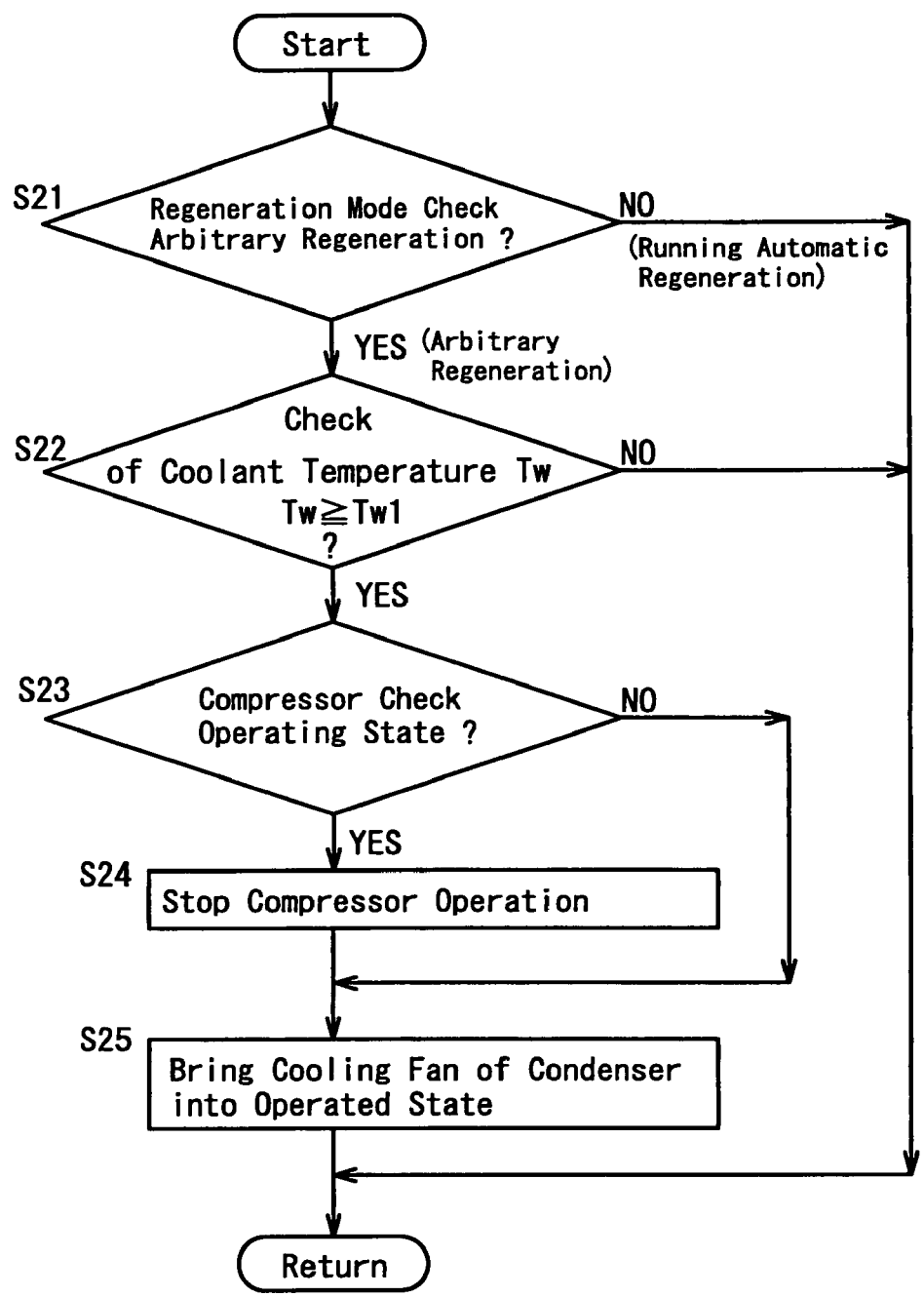
FIG. 4 is a diagram illustrating an air conditioner control flow of a second embodiment according to the present invention.

And the control to be associated with the operation of the compressor 41 at the exhaust temperature rise in the arbitrary regeneration mode in this second embodiment can be executed by the air conditioner control flow as shown in FIG. 4. The air conditioner control flow in FIG. 4 is shown as a control flow repeatedly invoked with an appropriate interval (time interval for carrying out control) when the DPF device 12 is forcedly regenerated by the regeneration control means 35C by the arbitrary regeneration at Step S27 in FIG. 5.

When the air conditioner control flow is invoked and started, the regeneration mode is checked at Step S21 to determine if it is the arbitrary regeneration mode or the running automatic regeneration mode. In this determination, if it is determined that the mode is not the arbitrary regeneration mode, the program returns.

On the other hand, if it is determined that the mode is the arbitrary regeneration mode in this determination, the engine coolant temperature Tw is checked at Step S22. In this check, if the engine coolant temperature Tw is below the predetermined coolant temperature Tw1 for determination, the program returns.

Also, if the engine coolant temperature Tw is at the predetermined coolant temperature Tw1 for determination or above in this check, it is checked if the compressor 41 of the air conditioner is in the operated state or not at Step S23. If it is in the operated state, the operation of the compressor 41 is stopped at Step S24, and the program goes to Step S25. If it is not in the operated state, the program goes to Step S25 as it is.

At Step S25, the cooling fan 43 for cooling the condenser 42 of the air conditioner is brought into the operated state. That is, if the cooling fan 43 is in the operated state, the operated state is maintained, while if it is in the operation stop state, it is brought into the operated state and the program returns.

As shown in the air conditioner control flow in FIG. 4, in the second embodiment, while it is determined that there is no risk of abnormally high temperature from the detected value of the engine coolant temperature Tw at that time, when the manual regeneration button 28 is pressed, the operation of the compressor 41 of the air conditioner, that is, the operation of the air conditioner is kept.

Also, when the engine coolant temperature Tw is at the predetermined coolant temperature Tw1 for determination or above and it is determined that there is a risk of abnormally high temperature, if the compressor 41 of the air conditioner is operating, this is turned OFF into the operation stop state. By this, the heat amount radiated from the condenser 42 is reduced, the operated state of the cooling fan 43 is kept, and cooling air is fed to the radiator 18 of the engine 10.

By giving consideration to the coolant temperature in this way, wasteful operation stop of the air conditioner can be avoided. Thus, such a situation that the air conditioner is suddenly turned off at arbitrary regeneration, which might give a sense of discomfort to the driver, can be prevented.

Therefore, in the above method of controlling the exhaust gas purification system and the exhaust gas purification system 1, rise of the engine coolant temperature Tw to an abnormally high temperature can be prevented during forced regeneration of the filter with catalyst 12b of the continuous regeneration type DPF device 12 in the arbitrary regeneration mode.

In the above description, as the DPF device in the exhaust gas purification system, a device in which a catalyst is carried on a filter and an oxidation catalyst is provided on the upstream side of the filter is used as an example, but the present invention is not limited to this, the present invention can be applied to other types of DPF such as a DPF device with a filter not carrying a catalyst, a continuous regeneration type DPF device in which the oxidation catalyst is carried on the filter, a continuous regeneration type DPF device in which the oxidation catalyst is provided on the upstream side of the filter or the like.

INDUSTRIAL APPLICABILITY

The method of controlling the exhaust gas purification system and the exhaust gas purification system of the present invention having the above-mentioned excellent effects, can be utilized extremely effectively as the method of controlling the exhaust gas purification system and the exhaust gas purification system for an internal combustion engine mounted on an automobile.

What is claimed is:

1. A method of controlling an exhaust gas purification system used in an internal combustion engine, the engine comprising, a diesel particulate filter device disposed in an exhaust gas passage thereof, a collection amount detection means for detecting a collection amount of diesel particulates in a filter of the diesel particulate filter device, a regeneration time determination means for determining regeneration time of the filter based on a detection result of the collection amount detection means, an exhaust temperature raising means for raising a temperature of an exhaust gas, and a regeneration control means for regenerating the filter when it is determined by the regeneration time determination means as the predetermined regeneration time, the regeneration control means having a forced regeneration mode that the exhaust temperature is raised by the exhaust temperature raising means so as to forcedly regenerate the filter when it is determined by the regeneration time determination means as the predetermined regeneration time and the exhaust gas temperature is low, and an arbitrary regeneration mode that the filter is arbitrarily regenerated based on the detection result of the collection amount detection means, wherein while the exhaust temperature is being raised by the exhaust temperature raising means in the arbitrary regeneration mode, a compressor of a vehicular air conditioner is brought into an operation stop state.

2. The method of controlling the exhaust gas purification system according to claim 1, wherein when the compressor of the air conditioner, a condenser of the air conditioner and a cooling fan for cooling the condenser are disposed in the vicinity of a radiator of the internal combustion engine, even in the operation stop state of the compressor, the cooling fan is kept in a driving state.

3. The method of controlling the exhaust gas purification system according to claim 1, wherein while the exhaust temperature is being raised by the exhaust temperature raising means in the arbitrary regeneration mode, only when a coolant temperature of the internal combustion engine is at a predetermined coolant temperature for determination or above, the compressor is brought into the operation stop state.

4. The method of controlling the exhaust gas purification system at least according to claim 1, wherein in an exhaust temperature rise control by the exhaust temperature raising means, multiple injection in cylinder injection and/or exhaust throttle is carried out.

5. An exhaust gas purification system used in an internal combustion engine, the engine comprising, a diesel particulate filter device disposed in an exhaust gas passage thereof, a collection amount detection means for detecting a collection amount of diesel particulates in a filter of the diesel particulate filter device, a regeneration time determination means for determining regeneration time of the filter based on a detection result of the collection amount detection means, an exhaust temperature raising means for raising a temperature of an exhaust gas, and a regeneration control means for regenerating the filter when it is determined by the regeneration time determination means as the predetermined regeneration time, the regeneration control means having a forced regeneration mode that the exhaust temperature is raised by the exhaust temperature raising means so as to forcedly regenerate the filter when it is determined by the regeneration time determination means as the predetermined regeneration time and the exhaust gas temperature is low, and an arbitrary regeneration mode that the filter is arbitrarily regenerated based on the detection result of the collection amount detection means, wherein while the regeneration control means is raising the exhaust temperature by the exhaust temperature raising means in the arbitrary regeneration mode, the regeneration control means carries out the control so that a compressor of a vehicular air conditioner is brought into an operation stop state.

6. The exhaust gas purification system according to claim 5, wherein when the compressor of the air conditioner, a condenser of the air conditioner, and a cooling fan for cooling the condenser are disposed in the vicinity of a radiator of the internal combustion engine, even in the operation stop state of the compressor, the regeneration control means carries out the control so that the cooling fan is kept in a driving state.

7. The exhaust gas purification system according to claim 5, wherein while the exhaust temperature is being raised by the exhaust temperature raising means in the arbitrary regeneration mode, only when a coolant temperature of the internal combustion engine is at a predetermined coolant temperature for determination or above, the regeneration control means carries out the control so that the compressor is brought into the operation stop state.

8. The exhaust gas purification system according to claim 5, wherein the exhaust temperature raising means carries out multiple injection in cylinder injection and/or exhaust throttle in an exhaust temperature rise control.

9. The exhaust gas purification system according to claim 5, wherein the diesel particulate filter device is any one or a combination of a diesel particulate filter device formed of a filter not carrying a catalyst, a continuous regeneration type diesel particulate filter device having a filter carrying an oxidation catalyst, a continuous regeneration type diesel particulate filter device provided with an oxidation catalyst on an upstream side of a filter, and a continuous regeneration type diesel particulate filter device having a filter carrying a catalyst and provided with an oxidation catalyst on the upstream side of the filter.

* * * * *